(12) United States Patent
Iwasaki

(10) Patent No.: US 9,027,156 B2
(45) Date of Patent: May 5, 2015

(54) TRANSMISSION APPARATUS, TRANSMISSION METHOD, AND RECORDING MEDIUM

(71) Applicant: Canon Kabushiki Kaisha, Tokyo (JP)

(72) Inventor: Shingo Iwasaki, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/752,764

(22) Filed: Jan. 29, 2013

(65) Prior Publication Data

US 2013/0198865 A1 Aug. 1, 2013

(30) Foreign Application Priority Data

Jan. 31, 2012 (JP) ................................ 2012-018557

(51) Int. Cl.
| | | |
|---|---|---|
| *G06F 21/00* | (2013.01) | |
| *G06F 21/62* | (2013.01) | |
| *H04N 21/218* | (2011.01) | |
| *H04N 21/234* | (2011.01) | |
| *H04N 21/258* | (2011.01) | |
| *H04N 21/2665* | (2011.01) | |
| *H04N 21/654* | (2011.01) | |
| *H04N 21/81* | (2011.01) | |
| *H04N 21/8547* | (2011.01) | |
| *H04N 21/858* | (2011.01) | |

(52) U.S. Cl.
CPC ............ *G06F 21/62* (2013.01); *G06F 21/6218* (2013.01); *H04N 21/21805* (2013.01); *H04N 21/2181* (2013.01); *H04N 21/234* (2013.01); *H04N 21/25875* (2013.01); *H04N 21/2665* (2013.01); *H04N 21/654* (2013.01); *H04N 21/8153* (2013.01); *H04N 21/8547* (2013.01); *H04N 21/8586* (2013.01)

(58) Field of Classification Search
CPC ....................................................... G06F 21/62
See application file for complete search history.

(56) References Cited

U.S. PATENT DOCUMENTS

| | | | | |
|---|---|---|---|---|
| 2008/0215766 | A1* | 9/2008 | Stobbe et al. | 710/15 |
| 2009/0271872 | A1* | 10/2009 | Ishizuka et al. | 726/28 |
| 2009/0328175 | A1* | 12/2009 | Shuster | 726/7 |

FOREIGN PATENT DOCUMENTS

| | | |
|---|---|---|
| JP | 2005345632 A | 12/2005 |
| JP | 2010-258487 A | 11/2010 |

* cited by examiner

*Primary Examiner* — Jeffrey Pwu
*Assistant Examiner* — Helai Salehi
(74) *Attorney, Agent, or Firm* — Canon USA Inc IP Division

(57) ABSTRACT

A transmission apparatus capable of transmitting a first content stored in a first storage area to a receiving apparatus includes a determination unit configured to determine whether the receiving apparatus has authority to access a second storage area storing a second content associated with the first content, a storage unit configured to store the second content in a third storage area different from the second storage area in a case where the receiving apparatus does not have authority to access the second storage area, and a transmission unit configured to transmit to the receiving apparatus access information for accessing the third storage area storing the second content by the storage unit.

12 Claims, 13 Drawing Sheets

TRANSMISSION APPARATUS, TRANSMISSION METHOD, AND RECORDING MEDIUM

BACKGROUND OF THE INVENTION

1. Field of the Invention

Aspects of the present invention generally relate to a technique for performing transmission according to authority over a content such as a still image or a moving image.

2. Description of the Related Art

Conventionally, there is a system for printing an access destination of a content such as a moving image or a sound associated with a still image, together with the still image, as identification information such as a barcode or a quick response (QR) code (registered trademark), and allowing an access to an associated content by reading the identification information.

For example, Japanese Patent Application Laid-Open No. 2010-258487 and Japanese Patent Application Laid-Open No. 2005-345632 discuss a web server and a terminal that read identification information for specifying an access destination of a content and access the read access destination.

If an owner of a content associated with a still image and an owner of the still image differ from each other, it is not always favorable that the owner of the still image may permit a receiver who receives the still image to which the identification information for specifying the access destination of the content associated with the still image to access the content. However, according to the conventional technique, the receiver who has received the still image can read the identification information and access the content.

As an improvement in such an issue, there is a method considering security such as an authentication password at the web server and the terminal as the access destination of the content. However, such a method becomes complicated because there is a plurality of processes to access the content. This takes a lot of time and labor.

SUMMARY OF THE INVENTION

Aspects of the present invention relate to a technique for enabling an owner of a content to prevent unintended access from a third person without complicating processes for accessing the content.

According to an aspect of the present invention, a transmission apparatus capable of transmitting a first content stored in a first storage area to a receiving apparatus includes a determination unit configured to determine whether the receiving apparatus has authority to access a second storage area storing a second content associated with the first content, a storage unit configured to store the second content in a third storage area different from the second storage area in a case where the receiving apparatus does not have authority to access the second storage area, and a transmission unit configured to transmit to the receiving apparatus access information for accessing the third storage area storing the second content by the storage unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
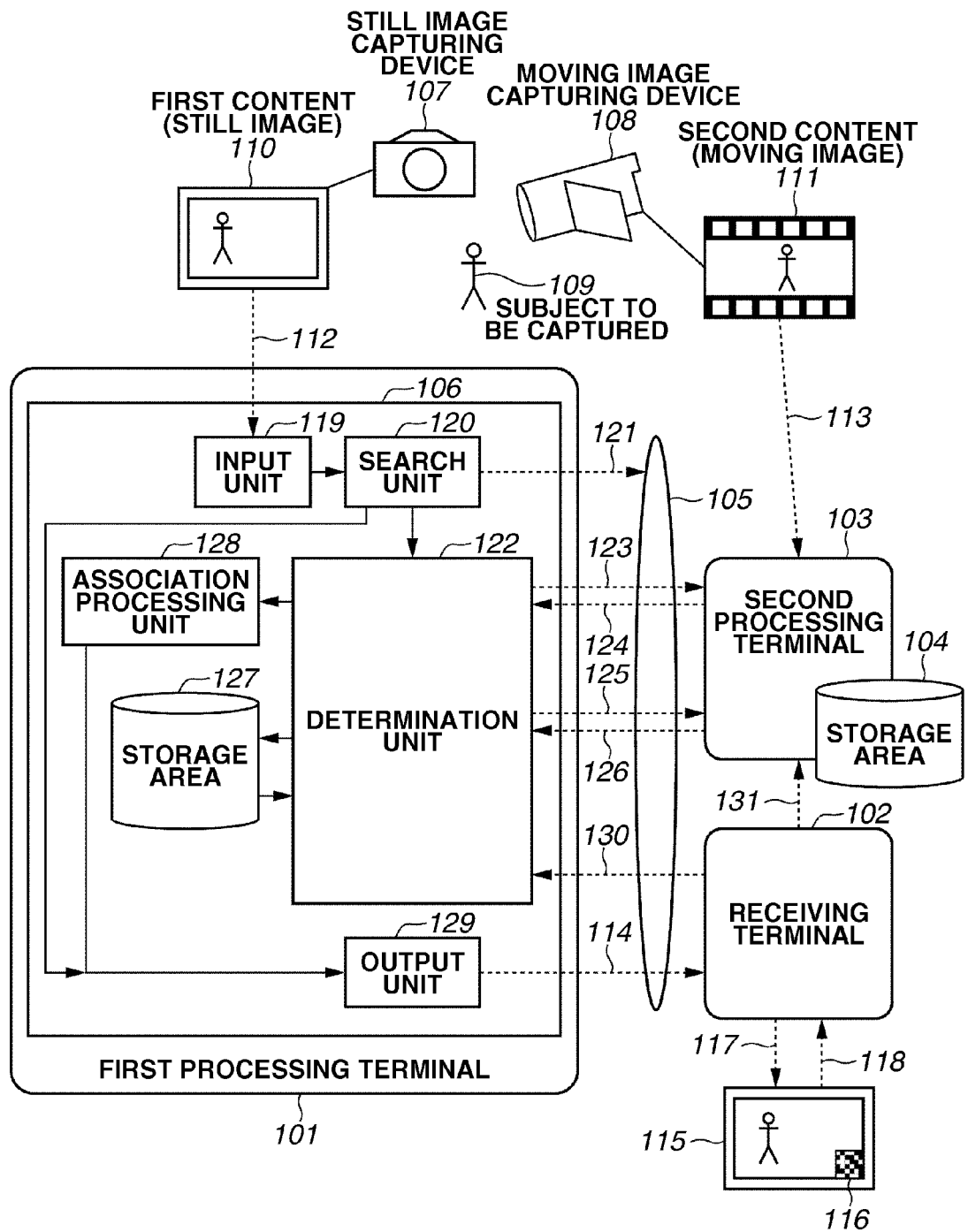
FIG. 1 is a block diagram illustrating an outline and a configuration example of a system according to a first exemplary embodiment.

FIG. 1 illustrates an outline and a configuration example of a push print system according to a first exemplary embodiment of the present invention. The outline of the push print system will be described below with reference to FIG. 1.

In the push print system in FIG. 1, a first processing terminal 101, a receiving terminal 102, and a second processing terminal 103 including a storage area 104 are connected to each other via a network 105 to exchange a content therebetween. According to the present exemplary embodiment, the receiving terminal 102 displays a received content. According to the present exemplary embodiment, the receiving terminal 102 prints the received content. A case in which the receiving terminal 102 displays and prints the received content is described in the present exemplary embodiment, however, the receiving terminal 102 may only print or only display the content.

According to the present exemplary embodiment, the first processing terminal 101 includes a content association device 106 according to authority. In FIG. 1, a still image capturing device 107 such as a digital camera and a moving image capturing device 108 such as a digital video camera capture the same subject to be captured 109. As a result of capturing the subject to be captured 109, a still image 110 is generated as a first content, and is input to the first processing terminal 101 (an arrow 112). A moving image 111 is generated as a second content, and is input to the second processing terminal 103 (an arrow 113).

The first processing terminal 101 associates the second content 111 stored in the second processing terminal 103 with the first content 110, generates identification information representing a storage destination of the second content 111 as a QR code, for example, and adds the generated QR code to the first content 110. Then, the first processing terminal 101 pushes the first content 110 to transmit to the receiving terminal 102, and issues a printing instruction (an arrow 114).

More specifically, the first processing terminal 101 associates the first content 110 stored in a storage area 127 (a first storage area) with the second content 111 stored in the storage area 104 (a second storage area) in the second processing terminal 103. Then, the first processing terminal 101 transmits to the receiving terminal 102 the first content 110 to which information representing the storage destination of the second content 111 (the storage area 104) is added. The receiving terminal 102 that has received the first content 110, prints a first content 115 to which a QR code 116 is added (an arrow 117). The receiving terminal 102 displays the second content 111 when it reads the QR code 116 added to the printed first content 115 (an arrow 118).

According to the present exemplary embodiment, the second content 111 is a moving image. Therefore, the moving image is reproduced. The above described is the outline of the push print system.

According to the present exemplary embodiment, in the above-described push print system, a manner of associating a second content with a first content 110 is changed according to authority of the receiving terminal 102 over the second content.

The still image capturing device 107 and the moving image capturing device 108 are not components essential for the present invention, although illustrated in FIG. 1. In addition, while a QR code is described as an example of identification information for identifying a second content, the identification information is not limited to the QR code.

The exemplary embodiment of the present invention will be described below with reference to the configuration illustrated in FIG. 1. In the content association device 106 according to authority, an input unit 119 inputs the first content 110 (the arrow 112). A search unit 120 analyzes information about the associated second content 111 from the first content 110, and searches the processing terminals connected via the network 105 for the second content 111 based on the analyzed information (an arrow 121). The information about the second content 111 includes identification information about a device that has captured the second content.

The search unit 120 specifies a content of which identification information about the device that has captured the content matches with the analyzed information and which includes the time when the first content 110 is captured in a time period during which the content is captured among the contents stored in the processing terminal as the second content 111. According to the present exemplary embodiment, it is assumed that the identification information about the device that has captured the content is embedded as tag information of the first content 110. However, the identification information about the device may be described in another file and associated therewith.

A method for specifying the second content 111 may include a method for considering, from global positioning system (GPS) information during capturing of contents, the content having the same GPS information as GPS information about the first content 110 as a second content. Therefore, a method performed when the second content 111 is searched for is not limited to a content of the present exemplary embodiment.

A determination unit 122 receives information about the specified second content 111 from the search unit 120. The second content 111 can be accessed from the receiving terminal 102. Therefore, the determination unit 122 confirms authority of the receiving terminal 102 over the second content 111 with the second processing terminal 103 storing the second content 111 from the received information about the second content 111 (an arrow 123).

For example, the determination unit 122 confirms whether the whole or a part of the second content 111 associated with the first content 110 may be transmitted to the receiving terminal 102. If the system includes a plurality of the receiving terminals 102, the determination unit 122 confirms authority with each of the plurality of the receiving terminals 102.

The determination unit 122 then confirms whether the receiving terminal 102 can directly access the second content 111 stored in the second processing terminal 103, and receives a confirmation result from the second processing terminal 103 (an arrow 124). Thus, the determination unit 122 determines whether the receiving terminal 102 has authority to access the second storage area (e.g., the storage area 104) storing the second content 111 associated with the first content 110.

The determination unit 122 determines whether the second content 111 is to be stored in its own terminal (i.e., the first processing terminal) according to the confirmation result. If the second content 111 is stored in the terminal of the determination unit 122, the determination unit 122 issues a request to obtain the second content 111 to the second processing terminal 103 storing the second content 111 (an arrow 125). Then, the determination unit 122 receives the second content 111 (an arrow 126), and stores the received second content 111 in the storage area 127 (a third storage area) provided in the own terminal.

According to the present exemplary embodiment, the second content 111 is stored in the terminal of the determination unit 122 when the receiving terminal 102 does not have authority to access the second storage area 104. If the receiving terminal 102 does not have the authority to access the second storage area 104, the first processing terminal 101 stores the second content 111 in the third storage area which is different from the second storage area 104.

On the other hand, if the second content 111 is not stored in the own terminal, the determination unit 122 issues a request to obtain a storage location of the second content 111 to the second processing terminal 103 storing the second content 111 (the arrow 125), and receives information about the storage location (the arrow 126).

An association processing unit 128 according to authority determines a manner of associating the second content 111 with the first content 110 according to the confirmation result by the determination unit 122.

For example, the identification information 116 such as a QR code or a barcode representing access information indicating a storage destination of the second content 111 is transmitted together with the first content 110. Further, if the content is a moving image or a sound, information such as a start position and an end position for content reproduction is also transmitted together with the identification information 116 such as a QR code or a barcode and the first content 110. An output unit 129 transmits the first content 110 to the receiving terminal 102, and issues a printing instruction (the arrow 114).

According to the present exemplary embodiment, if the receiving terminal 102 has authority to access the storage area 104 in the second processing terminal 103, the first processing terminal 101 transmits access information for obtaining the second content 111 stored in the storage area 104 to the receiving terminal 102. On the other hand, if the receiving terminal 102 does not have authority to access the storage area 104 in the second processing terminal 103, the first processing terminal 101 transmits access information for obtaining the second content 111 stored in the storage area 127 to the receiving terminal 102.

The receiving terminal 102 obtains and displays the second content 111, when the receiving terminal 102 reads the QR code as the identification information 116. In this case, the receiving terminal 102 can obtain the second content 111 from a terminal from which the second content 111 can be obtained without determining whether the receiving terminal 102 goes to the first processing terminal 101 to receive the second content 111 (an arrow 130) or goes to the second processing terminal 103 to receive the second content 111 (an arrow 131).

As described above, according to the present exemplary embodiment, a manner of associating the second content 111 with the first content 110 according to authority can be changed.

Figure 2:
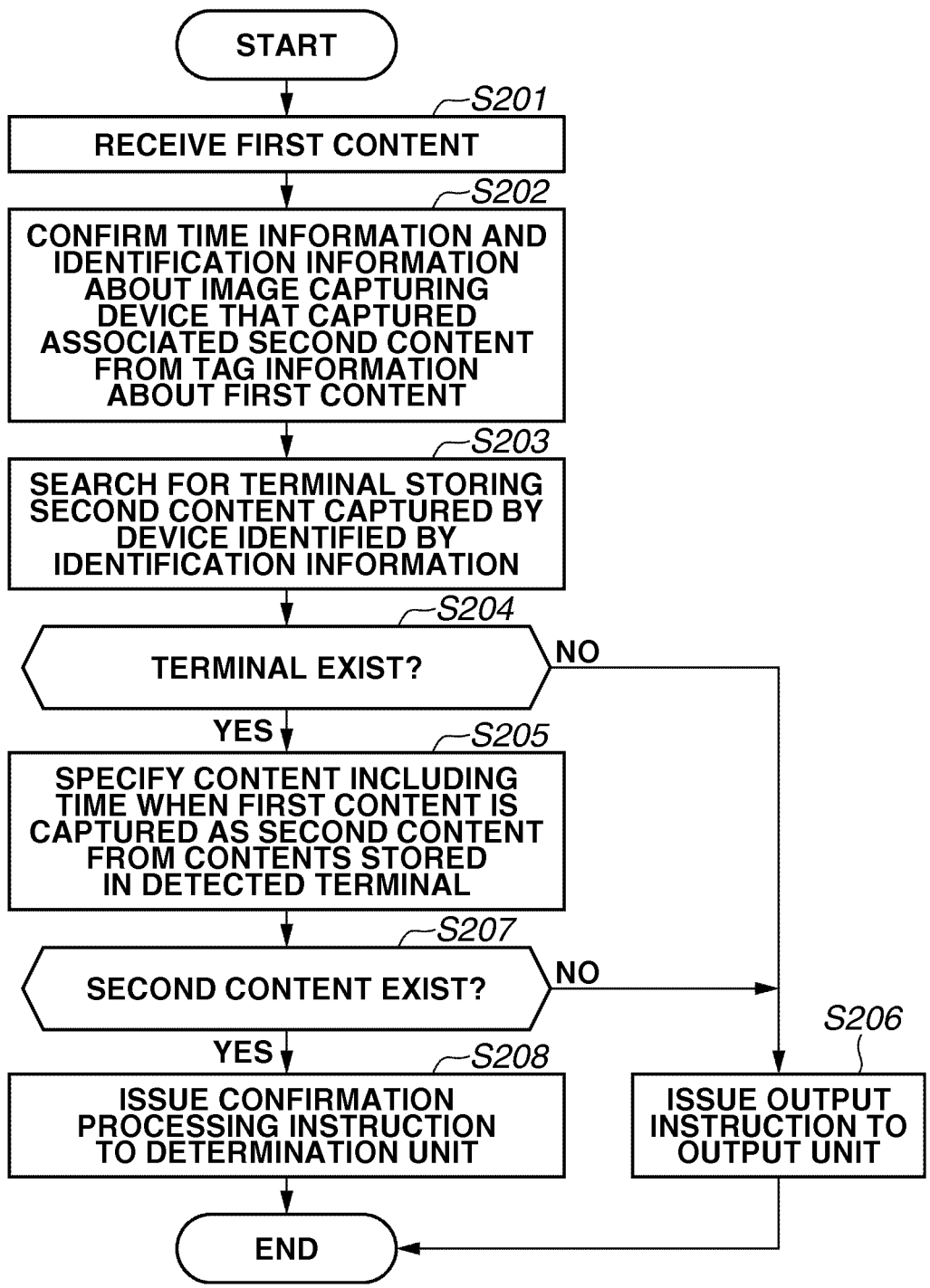
FIG. 2 is a flowchart illustrating a procedure for associated content search processing.

The processing procedure in each of the components constituting the present exemplary embodiment in FIG. 1 will be described below with reference to a flowchart of FIG. 2. FIG. 2 is a flowchart illustrating the procedure for specific processing of the search unit 120.

When the processing is started, then in step S201, the search unit 120 receives the first content 110 from the input unit 119.

In step S202, the search unit 120 analyzes and obtains information about the time when the first content 110 itself is captured and identification information about a device that has captured the associated second content 111 from tag information about the first content 110 or the like.

In the first content 110, the content capturing time information and the device identification information can be embedded as tag information using an exchangeable image file format (Exif), for example. The content capturing time information is stored as Exif information. According to the present exemplary embodiment, the device identification information is further stored as Exif information. According to the present exemplary embodiment, it is assumed that a person who has captured the first content 110 using the still image capturing device 107 embeds identification information about another device that has simultaneously captured the second content 111 at that time in Exif information about the first content 110.

While there is a method for inputting identification information about a device associated with the first content 110 and automatically embedding the input device identification information in the first content 110 at the first processing terminal 101, a method for embedding information in the first content 110 is not limited in the present invention.

In step S203, the search unit 120 uses the identification information about the device that has captured the second content 111, to search for the processing terminal storing the content captured by the device represented by the identification information from among the processing terminals connected via the network 105.

In step S204, the search unit 120 determines whether a target terminal exists. If the terminal exists (YES in step S204), the processing proceeds to step S205. If the terminal does not exist (NO in step S204), the processing proceeds to step S206.

In step S205, the search unit 120 specifies, from among the contents stored in the terminal which has been detected by the processing in step S203, a content which includes the time when the first content 110 is captured in a time period during which the content is captured, as the second content 111. For example, if the time when the first content 110 is captured is 9:00:00, and the times when the capturing of the second content 111 starts and ends are respectively 8:59:30 and 9:00:30, the search unit 120 determined that the time period during which the second content 111 is captured includes the time when the first content 110 is captured. Further, the search unit 120 may specify, from among the contents stored in the terminal that has been detected by the processing in step S203, a content that is captured in the vicinity of the time when the first content 110 is captured, as the second content 111.

In step S207, the search unit 120 determines whether the second content 111 exists. If the second content 111 exists (YES in step S207), the processing proceeds to step S208. If the second content 111 does not exist (NO in step S208), the processing proceeds to step S206.

In step S208, the search unit 120 issues an instruction to perform confirmation processing to the determination unit 122 because the second content 111 exists.

If the terminal does not exist (NO in step S204), or if the second content 111 does not exist (NO in step S207), the processing proceeds to step S206. In step S206, the search unit 120 determines that association processing is not required, and issues an instruction to directly output the first content 110 to the output unit 129.

Figure 3:
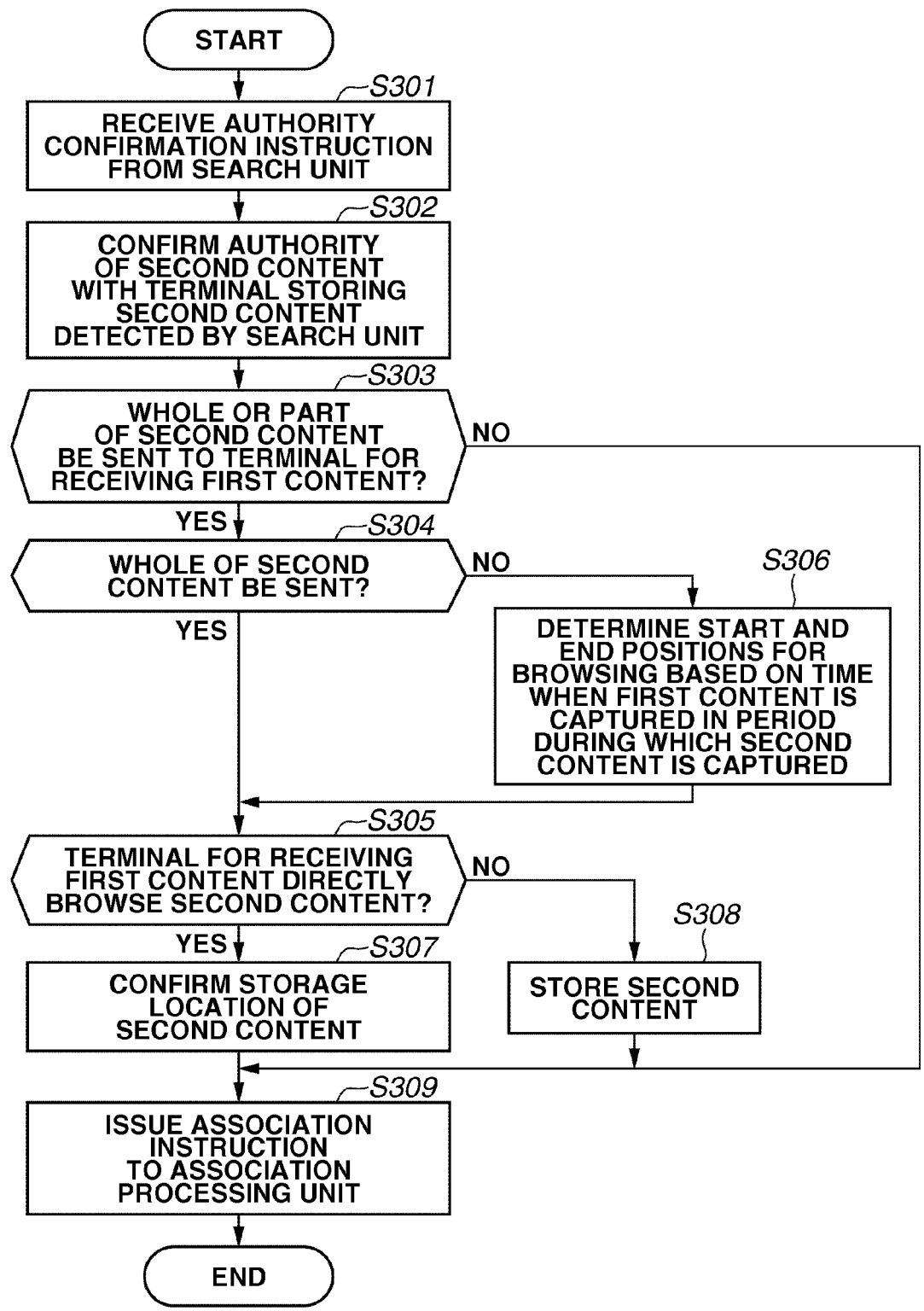
FIG. 3 is a flowchart illustrating a procedure for content authority confirmation and storage processing.

FIG. 3 is a flowchart illustrating the procedure for specific processing of the determination unit 122.

In step S301, the determination unit 122 receives an instruction to confirm authority from the search unit 120. In step S302, the determination unit 122 confirms authority over the second content 111 with a terminal storing the second content 111, i.e., the second processing terminal 103 detected by the search unit 120.

More specifically, the determination unit 122 confirms whether the whole or a part of the second content 111 may be transmitted with a terminal for receiving the first content 110, i.e., the receiving terminal 102. For example, if the receiving terminal 102 has authority to receive the whole of the second content 111, the receiving terminal 102 can reproduce the second content 111 from the beginning to the end. If the receiving terminal 102 has authority to receive a part of the second content 111, the receiving device 102 can reproduce only a scene in the middle of the second content 111. The determination unit 122 then confirms whether the terminal for receiving the first content 110 may directly access the second processing terminal 103 storing the second content 111 and browse the second content 111.

In step S303, the determination unit 122 determines whether the whole or a part of the second content 111 may be transmitted to the terminal for receiving the first content 110. If the whole or a part of the second content 111 may be transmitted (YES in step S303), the processing proceeds to step S304. On the other hand, if the transmission of the whole or a part of the second content 111 to the receiving terminal 102 is limited (NO in step S303), the processing proceeds to step S309.

In step S304, the determination unit 122 further determines whether the whole of the second content 111 may be transmitted. If the receiving terminal 102 has the authority to receive the whole of the second content 111 (YES in step S304), the processing proceeds to step S305. On the other hand, if the receiving terminal 102 has the authority to receive a part of the second content 111 (NO in step S304), the processing proceeds to step S305 via step S306.

In step S306, the determination unit 122 determines a start position and an end position for browsing the second content 111 based on the time when the first content 110 is captured within the time period during which the second content 111 is captured.

For example, in the time period during which the second content 111 is captured, positions at time that are several seconds before and after a scene corresponding to the first content 110, centered at the time when the first content 110 is captured are respectively determined as a start position and an end position. A basis for determining to what degree of range is determined as a part of the second content 111 has various forms. For example, it may be 10 seconds before and after the scene. Alternatively, it may be 20% of the whole of the second content 111, centered at the time when the first content 110 is captured. However, the basis is not limited in the present exemplary embodiment.

Information about the basis has various forms. For example, the information may be previously stored in the first processing terminal 101, or may be received from the exterior for each processing. However, how to obtain the information is also not limited in the present exemplary embodiment. A determination content in the processing in step S306 may be obtained from the second processing terminal 103.

If it is determined that the terminal for receiving the first content 110 may directly access the second processing terminal 103 storing the second content 111 and browse the second content 111 (YES in step S305), the processing proceeds to step S307. Otherwise (NO in step S305), the processing proceeds to step S308.

In step S307, the determination unit 122 confirms information about a storage location of the associated second content 111, e.g., information such as a uniform resource locator (URL) that is assumed as an access destination with the second processing terminal 103.

In step S308, the determination unit 122 obtains the associated second content 111 from the second processing terminal 103, and stores the obtained second content 111 in the own storage area 127.

In step S309, the determination unit 122 delivers an authority confirmation result, information about the presence or absence of storage of the second content 111, information about a storage location, and information about a start position and an end position for browsing the second content 111 to the association processing unit 128, and issues an association instruction.

When it is determined that the whole of the second content 111 may be transmitted in step S304, Times at the start and the end of the second content 111 are respectively set as the start position and the end position of the second content 111 to be transmitted.

If it is determined that the terminal for receiving the first content 110 has no authority to transmit the whole or a part of the second content 111 (NO in step S303), the determination unit 122 determines that the receiving terminal 102 has no authority to browse the second content 111. More specifically, if it is determined that the receiving terminal 102 has no authority to receive the whole or apart of the second content 111 (NO in step S303), the determination unit 122 does not transmit access information for accessing the second content 111 to the receiving terminal 102.

While it is described that the first processing terminal 101 obtains the second content 111 from the second processing terminal 103 in step S308, the second processing terminal 103 storing the second content 111 may transmit the second content 111 to the first processing terminal 101 that confirms authority if the second content 111 is not desired to be directly browsed from the terminal for receiving the first content 110.

Figure 4:
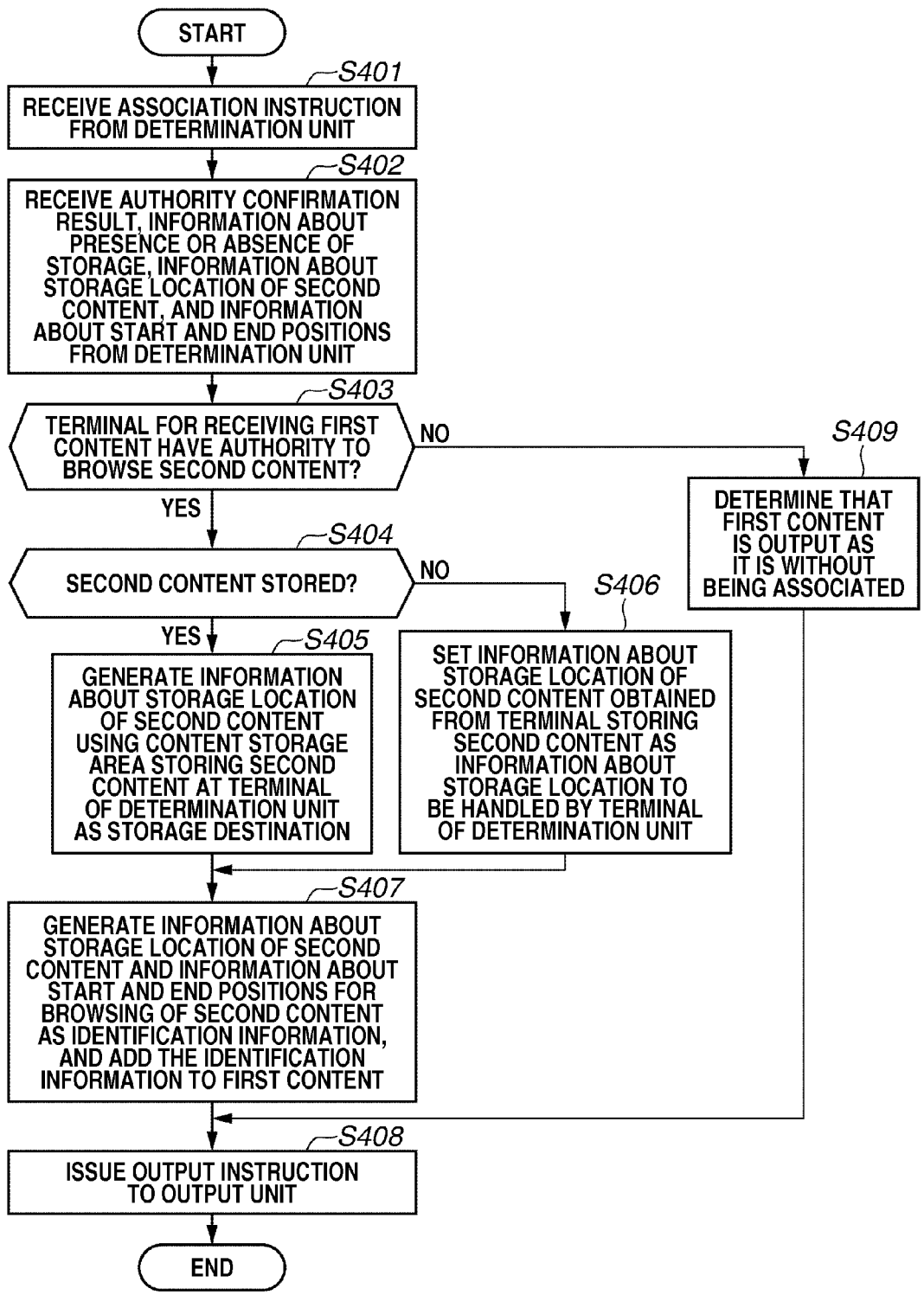
FIG. 4 is a flowchart illustrating a procedure for association processing according to authority.

FIG. 4 is a flowchart illustrating the procedure for specific processing of the association processing unit 128. When the processing is started, in step S401, the association processing unit 128 receives an association instruction from the determination unit 122.

In step S402, the association processing unit 128 receives an authority confirmation result, information about the presence or absence of storage of the second content 111, information about a storage location of the second content 111, and information about a start position and an end position for browsing the second content 111.

In step S403, the association processing unit 128 determines whether the terminal for receiving the first content 110, i.e., the receiving terminal 102 has authority to browse the second content 111 based on the received information. If the receiving terminal 102 has authority to browse the second content 111 (YES in step S403), the processing proceeds to step S404.

In step S404, the association processing unit 128 determines whether the second content 111 is stored in the storage area 127 in the terminal of its own. If the second content 111 is stored in the storage area 127 (YES in step S404), the processing proceeds to step S405.

In step S405, the association processing unit 128 generates information about the storage location of the second content 111 using the storage area 127 storing the second content 111 as a storage destination at the terminal of the determination unit 122. The information about the storage location of the second content 111 may be generated as a format of a URL representing an access destination by opening the second content 111 using a mechanism such as a web server.

If a content is exchanged using a file transfer protocol (FTP) between terminals, the information about the storage location of the content may be generated as an access format used to transmit and receive the content using the FTP. According to the present exemplary embodiment, storage location information and a method for actually exchanging a content are not particularly limited. For convenience of description, the storage location information will be described using the URL format.

If it is determined that the second content 111 is not stored in the terminal of its own (NO in step S404), the processing proceeds to step S406. In step S406, the association processing unit 128 sets the storage location information about the second content 111 which has been obtained from the terminal storing the second content 111 as storage location information to be handled by the terminal of the association processing unit 128.

In step S407, the storage location information about the second content 111 and the information about the start position and the end position for browsing the second content 111 are associated with the first content 110. For example, it is assumed that the storage location information about the second content 111 is indicated by a URL "http://terminal101/content02.mov". The start position and the end position are respectively indicated by times 9:00:00 ("090000") and 9:00:30 ("090030"). In the case, a URL "http://terminal101/content02.mov?start=090000&end=090030" of the storage location information and the start position and the end position are combined with each other is generated as one pieces of URL information. The generated URL information is associated with the first content 110 by being generated as a QR code and a barcode, for example, and embedded in the first content 110. In step S408, the association processing unit 128 issues an instruction to output the first content 110 to the output unit 129.

On the other hand, if it is determined that the terminal for receiving the first content 110, i.e., the receiving terminal 102 does not have authority to browse the second content 111 (NO in step S403), the processing proceeds to step S409.

In step S409, the association processing unit 128 determines that the first content 110 is output as it is without being associated.

Figure 5:
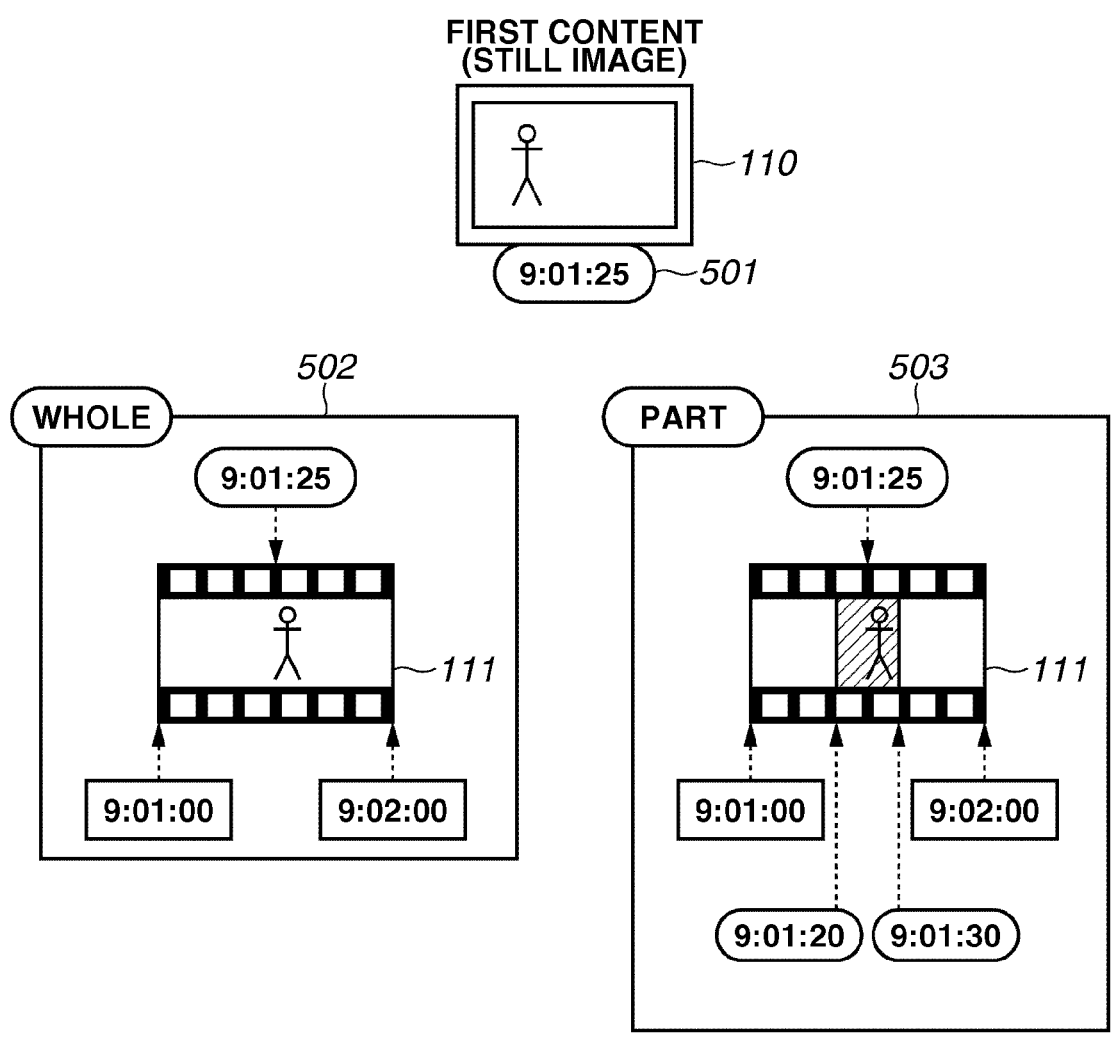
FIG. 5 illustrates a specific example of contents.

FIG. 5 illustrates what is the whole or a part of the content more specifically when the determination unit 122 determines whether the whole or a part of the second content 111 may be transmitted.

In FIG. 5, it is assumed that the time when the first content 110 is captured is 9:01:25, as illustrated in a range 501. "The whole" is a case where the second content 111 can be browsed from the beginning to the end as illustrated in a range 502. "Apart" is a case where the second content 111 can be browsed only for a range of several seconds, for example, before and after the time when the first content 110 is captured (9:01:25) (five seconds in the present exemplary embodiment), as illustrated in a range 503

The above-described procedure enables, at a terminal which transmits the first content 110 by adding the identification information for specifying the second content 111, a manner of associating the contents according to authority that the terminal for receiving the first content 110 has over an owner of the second content 111 to be changed.

While the exemplary embodiment of the push print system is described above, the present invention is not limited to this embodiment. In a push print system, there may be a plurality of second contents, and there may be a plurality of terminals storing the second contents. An exemplary embodiment in such case will be described below as a second exemplary embodiment.

Figure 6:
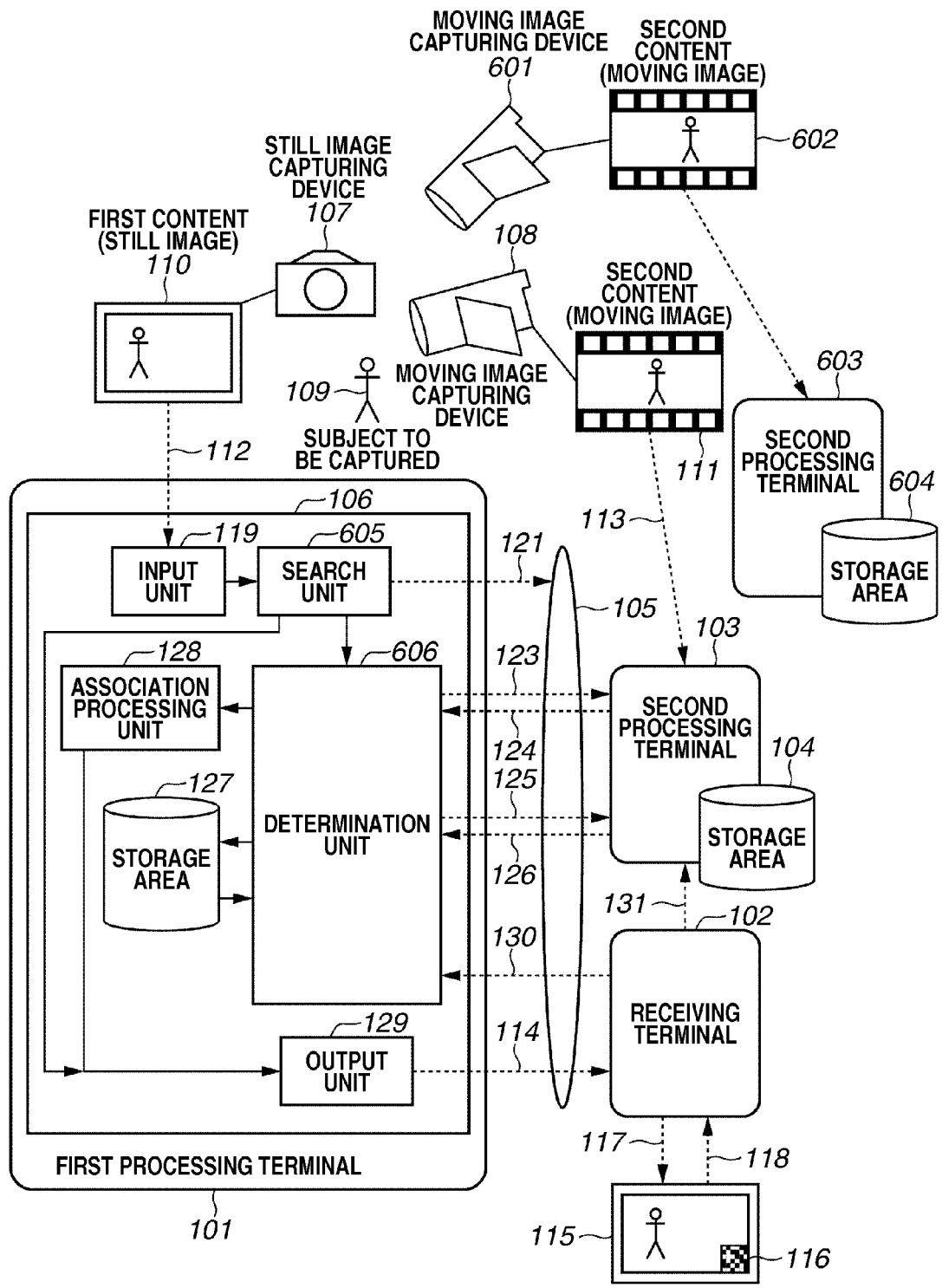
FIG. 6 is a block diagram illustrating an outline and a configuration example of a system according to a second exemplary embodiment.

FIG. 6 illustrates an outline and a configuration example of the push print system according to the second exemplary embodiment of the present invention, and particularly illustrates a case where the system includes a plurality of moving image capturing devices that respectively capture second contents and a plurality of terminals respectively storing the second contents.

According to the present exemplary embodiment, a plurality of second contents is a plurality of contents associated with a first content. The plurality of second contents may be stored in the same storage area. Alternatively, the plurality of second contents may be stored in different storage areas. The respective plurality of second contents need not be the same.

The configuration illustrated in FIG. 6 is a partial modification of that in FIG. 1. The same components as those illustrated in FIG. 1 are assigned the same reference numerals, and description of the same processes as those illustrated in FIG. 1 is not repeated in the present exemplary embodiment.

In FIG. 6, a moving image capturing device 601 can include a digital video camera, and is a device different from a moving image capturing device 108. A second processing terminal 603 including a storage area 604 stores a second content 602 captured by the moving image capturing device 601. Accordingly, the two second contents 111 and 602 exist within the push print system according to the present exemplary embodiment.

Processing performed when the number of second contents is two or more will be described below. A search unit 605 detects the plurality of second contents associated with a first content 110, and thus determines the second content to be associated with the first content 110 from among the detected plurality of second contents. More specifically, the search unit 605 determines which of the second content 111 and the second content 602 is to be associated with the first content 110 by determining priorities assigned to the second contents 111 and 602 from the time when the first content 110 is captured and a time period during which each of the second contents 111 and 602 is captured. In an operation of a determination unit 606 according to the priorities, authority is confirmed in descending order of the priorities assigned to the second contents that have been detected by the search unit 605.

By performing the above-described processing, the first content 110 can be transmitted by associating the higher-priority second content with the first content 110 in the present exemplary embodiment. The other processing are the same as those in the first exemplary embodiment, and hence description thereof is not repeated.

Figure 7:
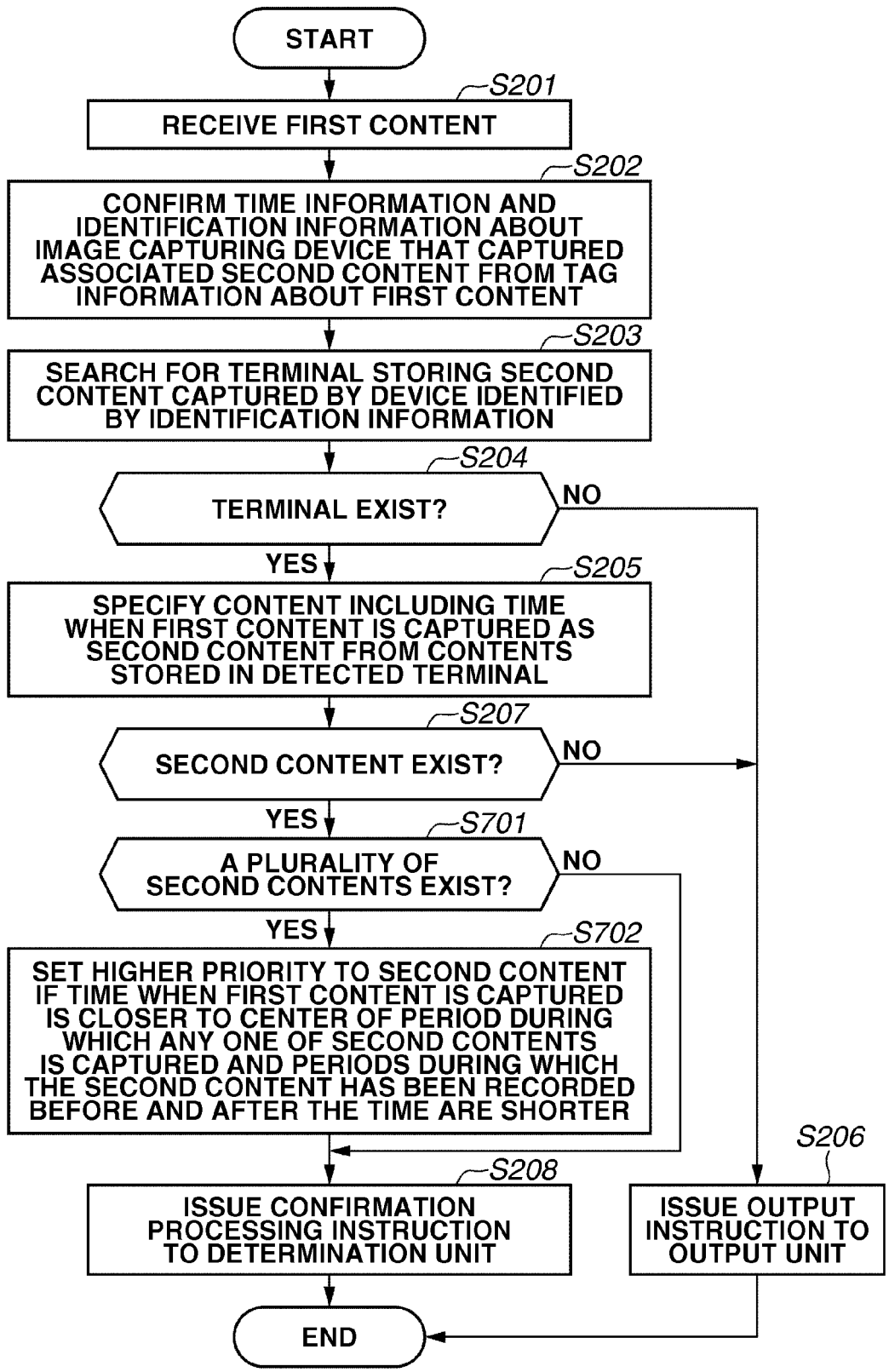
FIG. 7 is a flowchart illustrating a procedure for content search and priority determination processing.

FIG. 7 is a flowchart illustrating the procedure for specific processing of the search unit 605. The same processes as those of the search unit 120 in the flowchart illustrated in FIG. 2 are assigned the same step numbers, and hence description thereof is not repeated.

In FIG. 7, in step S207 described above, the search unit 605 determines whether the second content exists. If the second content exists (YES in step S207), the processing proceeds to step S701. In step S701, the search unit 605 further determines whether a plurality of second contents exists. If the plurality of second contents exists (YES in step S701), the processing proceeds to step S702. If the plurality of second contents does not exist (NO in step S701), the processing proceeds to step S208.

In step S702, among the plurality of second contents, the search unit 605 sets a higher priority to the second content in which the time when the first content 110 is captured is closer to the center of a time period during which the second content is captured, and time periods during which the second content has been recorded before and after the time when the first content 110 is captured are shorter.

Figure 8:
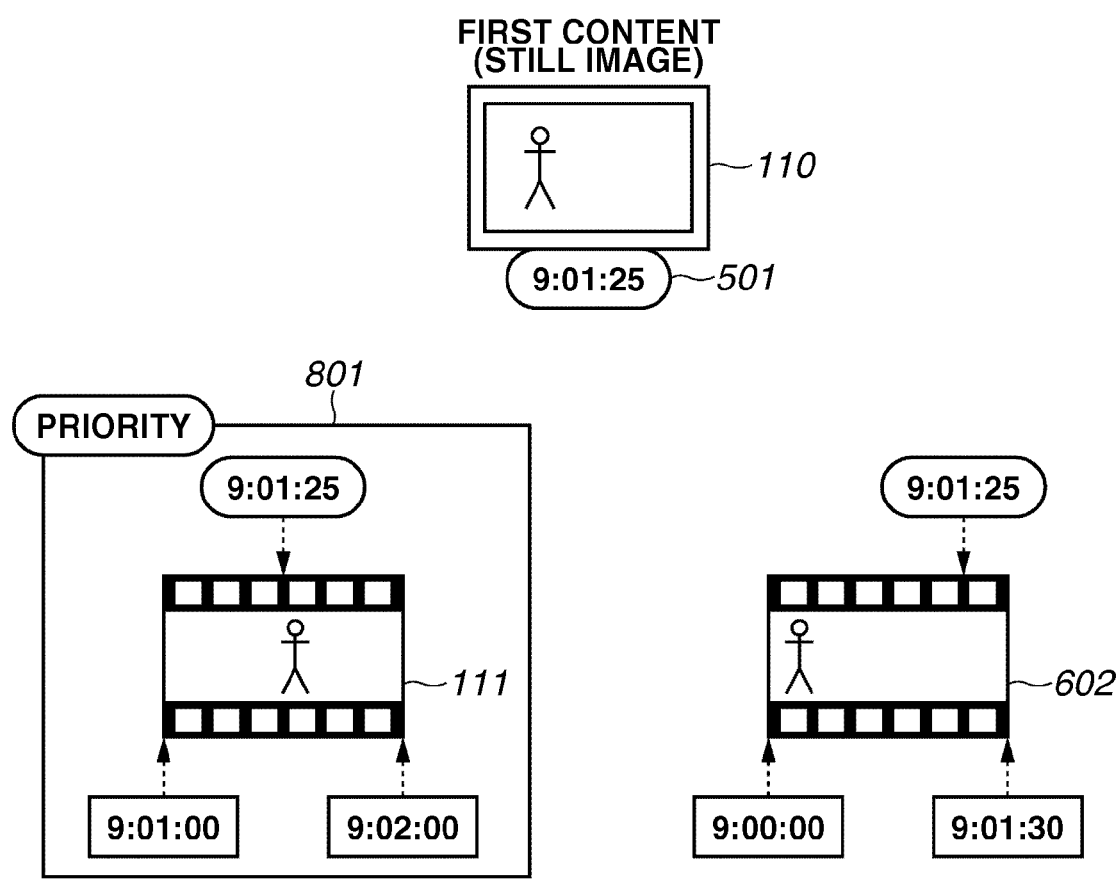
FIG. 8 illustrates a specific example of contents.

FIG. 8 illustrates a specific example of a content given a higher priority in the processing in step S702 performed by the search unit 605.

In FIG. 8, it is assumed that the time when the first content 110 is captured is 9:01:25, as illustrated in a range 501. The time when the capturing of the second content 111 starts is 9:01:00, and the time when the capturing thereof ends is 9:02:00. On the other hand, the time when the capturing of the second content 602 starts is 9:00:00, and the time when the capturing thereof ends is 9:01:30. If both the second contents 111 and 602 are compared with each other, the time when the first content 110 is captured is closer to the center of a time period during which the second content 111 is captured, and the time periods during which the second content 111 has been recorded before and after the time when the first content 110 is captured are shorter, as illustrated in a range 801. Therefore, it can be determined that the second content 111 is preferentially processed.

Figure 9:
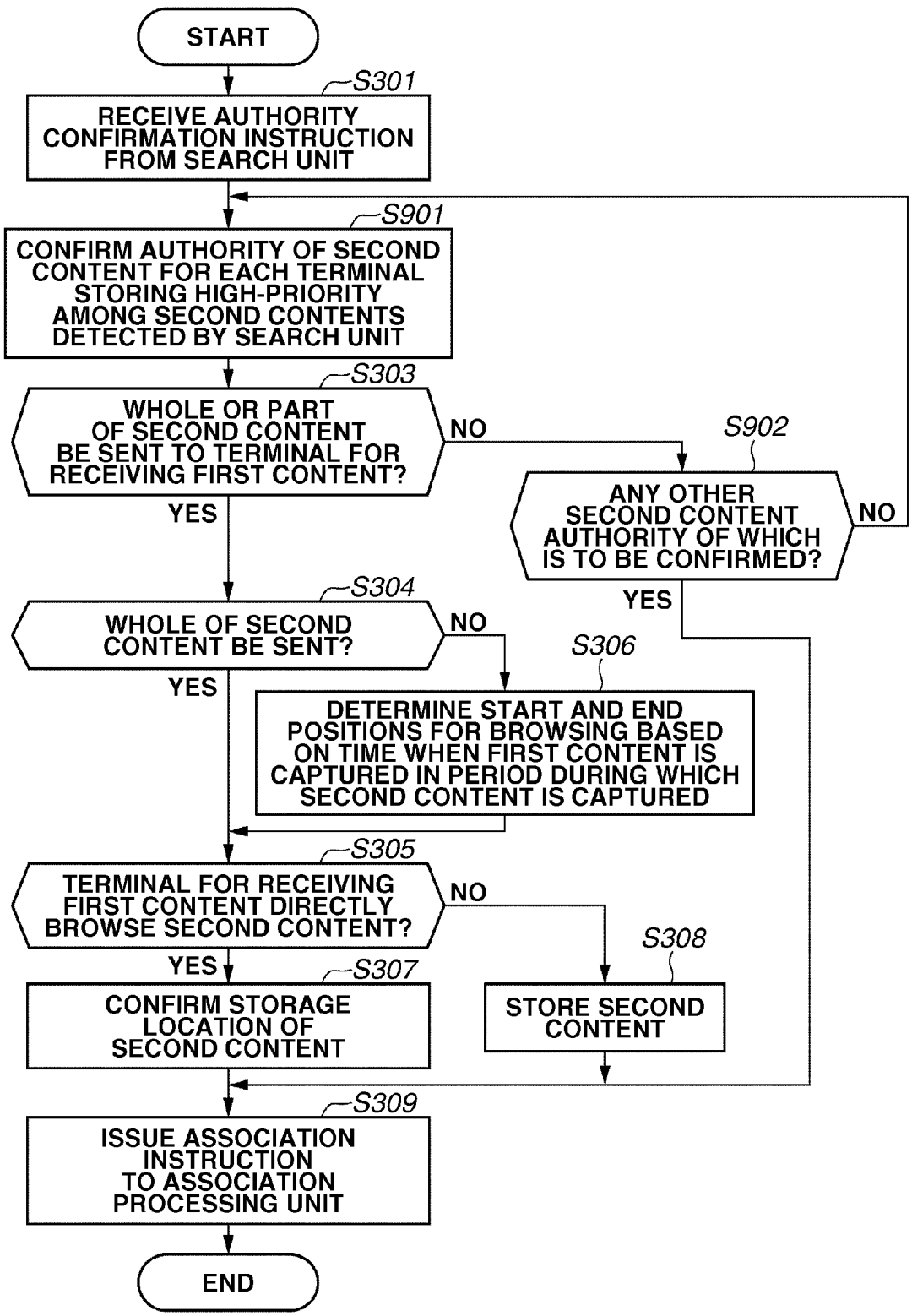
FIG. 9 is a flowchart illustrating a procedure for content authority confirmation and storage processing.

FIG. 9 is a flowchart illustrating the procedure for specific processing of the determination unit 606. The same processes as those of the determination unit 122 in the flowchart illustrated in FIG. 3 are assigned the same step numbers, and hence description thereof is not repeated.

In FIG. 9, in step S901, the determination unit 606 confirms, among the second contents detected by the search unit 605, authority of the terminal storing the higher-priority second content over the second content. If it is determined that there is no permission to transmit the second content to the terminal for receiving the first content 110 (NO in step S303), the processing proceeds to step S902.

In step S902, the determination unit 606 confirms whether there is no other second content over which authority is to be confirmed. If there is a second content over which authority is not confirmed yet (NO in step S902), the processing returns to step S901. If there is no other second content over which authority is not confirmed yet (YES in step S902), the processing proceeds to step S309.

Thus, the first processing terminal 101 performs first determination for determining whether the receiving terminal 102 has authority to access the second storage area storing the second content associated with the first content 110. Further, the first processing terminal 101 performs second determination for determining whether the receiving terminal 102 has authority to access a third storage area storing a third content associated with the first content 110. The first processing terminal 101 performs the first determination and the second determination in the order based on the time when the second content is captured and the time when the third content is captured.

By performing the above-described processing, if the plurality of second contents exists, authority to transmit the second contents to the terminal for receiving the first content 110 can be confirmed in descending order of priorities assigned to the second contents. Therefore, if the plurality of second contents exists, processing for determining the priorities assigned to the second contents and determining the second content to be associated with the first content 110 can be performed.

Thus, the first processing terminal 101 transmits to the receiving terminal 102 access information for accessing a storage area storing the content that is selected based on the time when each of the contents is captured among a plurality of contents.

While the second exemplary embodiment of the push print system has been described above, the present invention is not limited to this embodiment. In a push print system, if there is a plurality of second contents and there is a plurality of terminals storing the second contents, the plurality of second contents may be associated with a first content. An exemplary embodiment in such a case will be described below as a third exemplary embodiment.

Figure 10:
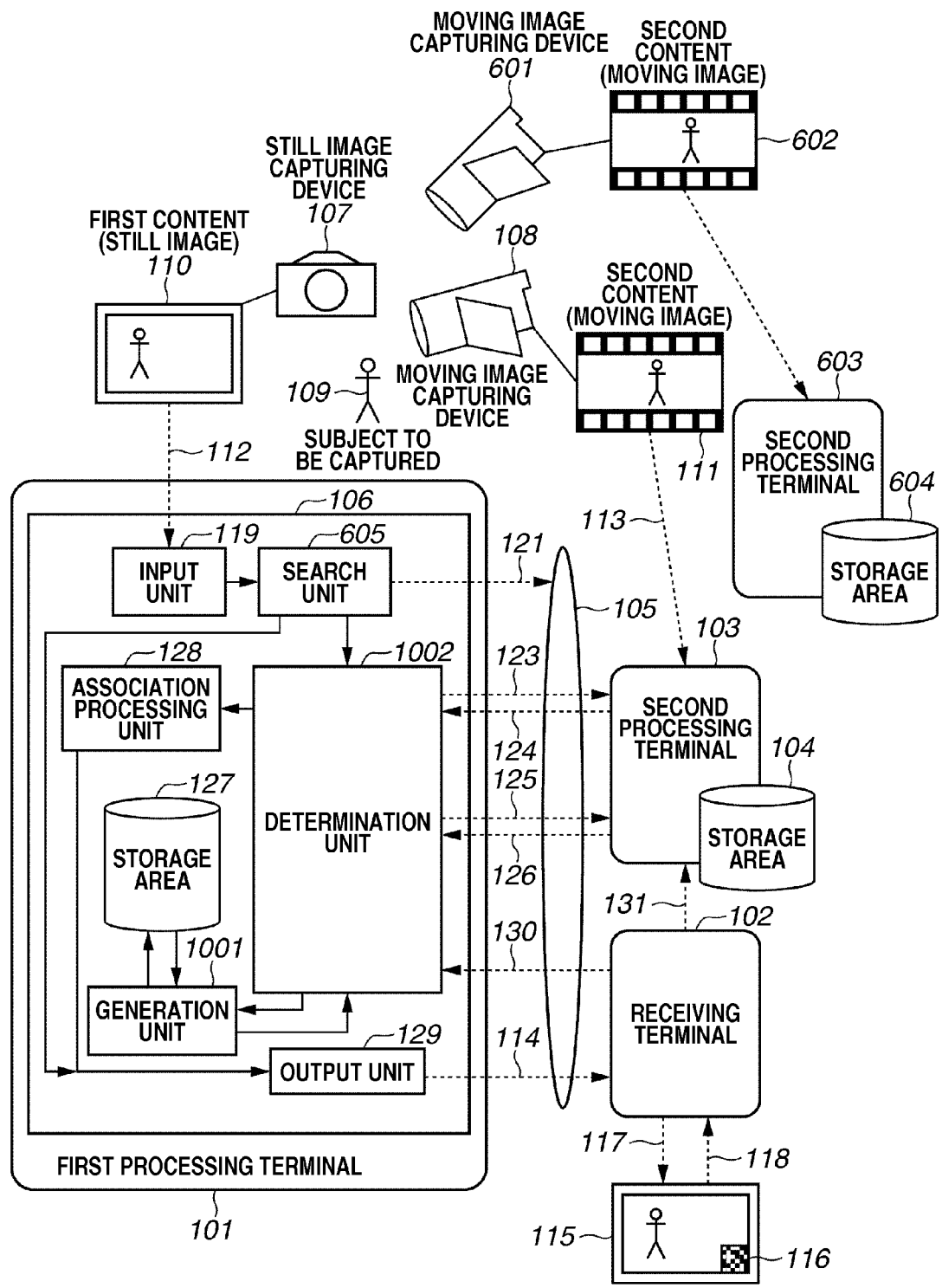
FIG. 10 is a block diagram illustrating an outline and a configuration example of a system according to a third exemplary embodiment.

FIG. 10 illustrates an outline and a configuration example of a push print system according to the third exemplary embodiment of the present invention, and particularly illustrates a case where the system includes a generation unit 1001 for editing a plurality of second contents, and processing for calling the generation unit 1001 is performed. The configuration illustrated in FIG. 10 is a partial modification of that in FIG. 6. The same components as those illustrated in FIG. 6 are assigned the same reference numerals, and description thereof is not repeated.

In FIG. 10, a determination unit 1002 determines, among a plurality of second contents associated with a first content 110, whether only parts of the respective second contents may be transmitted to a terminal for receiving the first content 110. If it is determined that only respective parts of all the plurality of second contents may be transmitted, the determination unit 1002 delivers the plurality of second contents to the generation unit 1001, and issues an instruction to perform edit processing.

The generation unit 1001 combines respective parts of the second contents in descending order of priorities assigned to the second contents, to generate one edited moving image. By performing the above-described processing, the edited moving image can be associated with the first content 110 and transmitted. Therefore, when the receiving terminal 102 receives the first content 110 and reads a QR code 116, various moving images captured at various angles are displayed at once.

Figure 11:
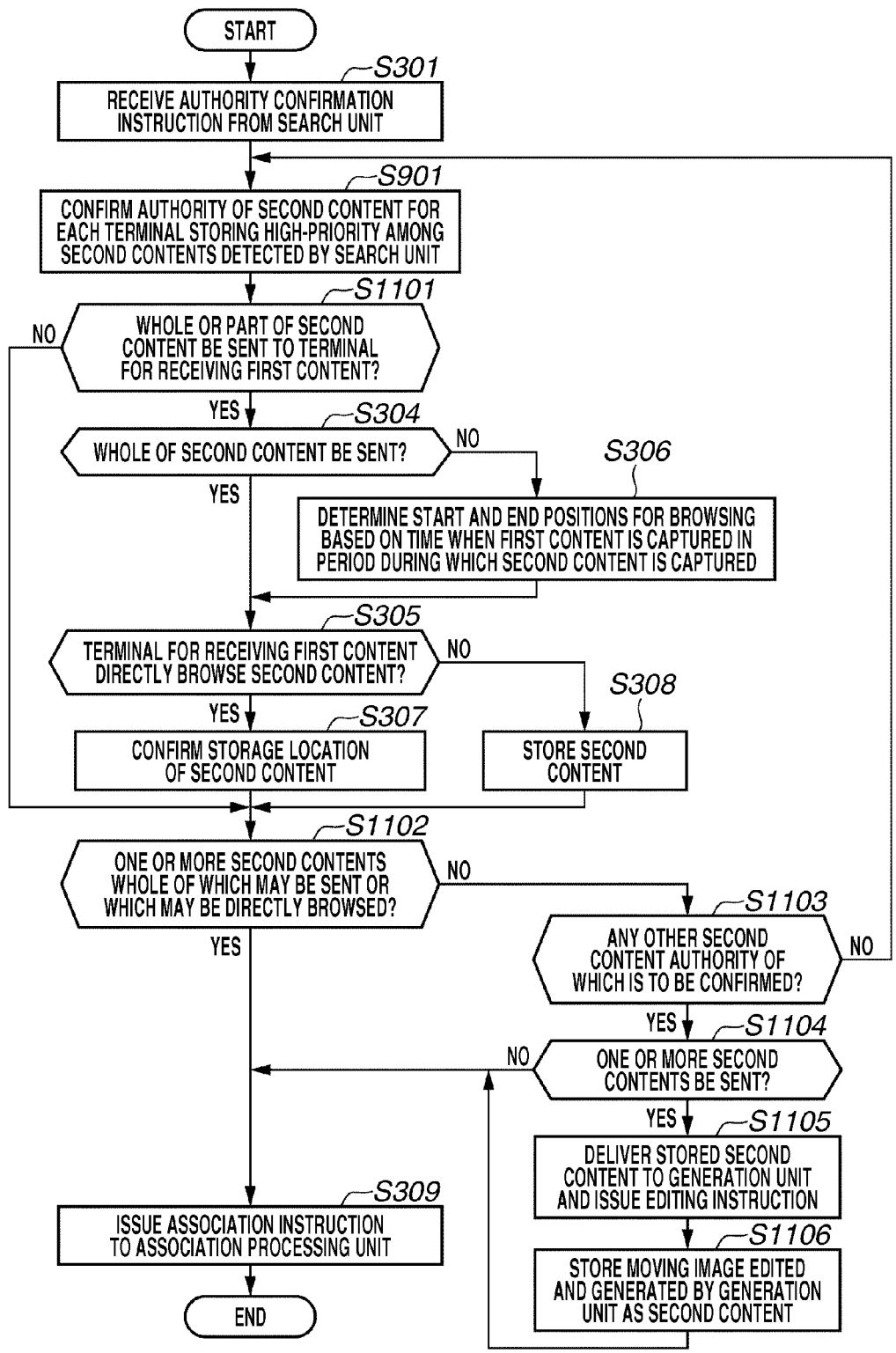
FIG. 11 is a flowchart illustrating a procedure for generation determination and storage processing of edited moving image.

FIG. 11 is a flowchart illustrating the procedure for specific processing performed by the determination unit 1002. The processing in the flowchart is implemented when a program recorded in a nonvolatile memory is rasterized into a memory functioning as a work memory and is executed by a central processing unit (CPU). The same processes as those in the flowchart illustrating the operation of the determination unit 606 according to the priorities illustrated in FIG. 9 are assigned the same reference numerals, and hence description thereof is not repeated.

In FIG. 11, if the determination unit 1002 determines that the second content is not transmitted to the terminal for receiving the first content 110 (NO in step S1101), the processing proceeds to step S1102.

In step S1102, the determination unit 1002 determines, among the plurality of second contents, whether there is one or more second contents that whole thereof may be transmitted or there is one or more second contents which may be directly browsed by the terminal for receiving the first content 110.

If it is determined that there is one or more second contents which satisfies the conditions of determination (YES in step S1102), the processing proceeds to step S309. If it is not determined that there is one or more second contents which satisfies the conditions of determination (NO in step S1102), the processing proceeds to step S1103.

In step S1103, the determination unit 1002 determines whether there remains no other second content over which authority is to be confirmed. If there remains no other second content over which authority is to be confirmed (YES in step S1103), the processing proceeds to step S1104. If there remains a second content over which authority is to be confirmed (NO in step S1103), the processing returns to step S901 to confirm authority over the second content.

In step S1104, the determination unit 1002 determines whether there is one or more second contents that may be transmitted to the terminal for receiving the first content 110. If there is one or more second contents that may be transmitted (YES in step S1104), the processing proceeds to step S1105. If there is no second content that may be transmitted (NO in step S1104), the processing proceeds to step S309.

If there is one or more second contents that may be transmitted at the time point of the processing in step S1104, it means that only the second content only a part of which may be determined to be transmitted is stored. Thus, in step S1105, the determination unit 1002 delivers the second content only a part of which may be determined to be transmitted to the generation unit 1001, to issue an instruction to perform editing.

In step S1106, the determination unit 1002 receives a moving image that has been edited and generated by the generation unit 1001, and stores the moving image as the second content in a storage area 127 in its own terminal. Therefore, a new second content obtained by combining the plurality of second contents associated with the first content 110 can be associated with the first content 110 and transmitted.

AS described above, the plurality of second contents associated with the first content 110 are combined with one another. The combined second contents are stored in the second storage area 127. Then, access information for accessing the combined contents is transmitted to the receiving terminal 102.

By performing the processing in the above-described steps, if there is one or more second contents whole thereof may be transmitted or if there is one or more second contents that can be directly browsed by the terminal for receiving the first content 110, processing for transmitting these second contents and ignoring the other second contents can be implemented.

Figure 12:
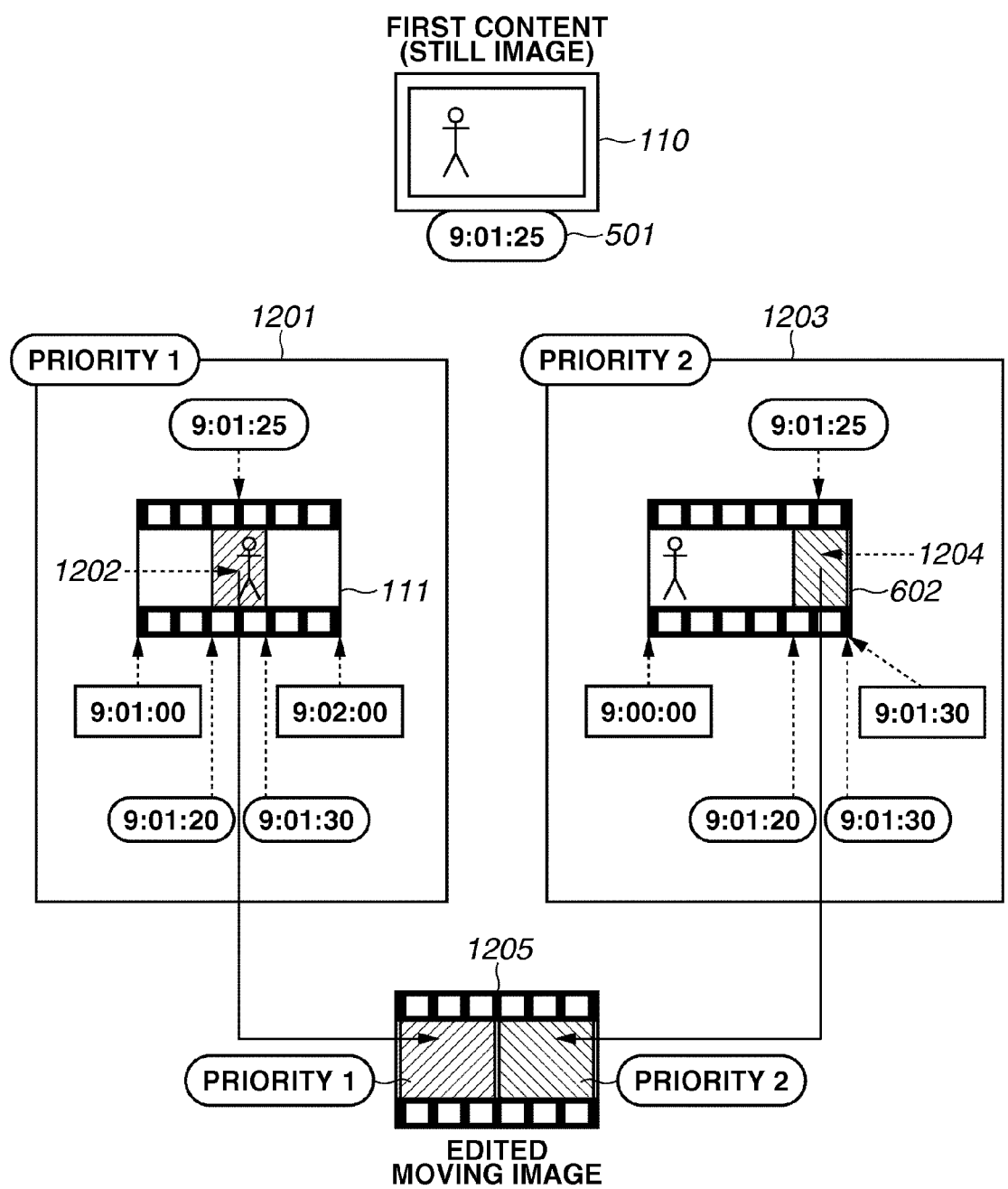
FIG. 12 illustrates a specific example of contents.

FIG. 12 illustrates a specific example of edit processing in the processing of the generation unit 1001. In FIG. 12, it is assumed that the time when the first content 110 is captured is 9:01:25, as illustrated in a range 501.

As illustrated in a range 1201, if only a range 1202 that is several seconds (five seconds in the present exemplary embodiment), for example, before and after the time when the first content 110 is captured can be browsed in a time period during which the second content 111 is captured, the range 1202 is determined to be "a part".

Similarly, as illustrated in a range 1203, if only a range 1204 that is several seconds (five seconds in the present exemplary embodiment) before and after the time when the first content 110 is captured in a time period during which the second content 602 is captured, the range 1204 is determined to be "a part". A higher priority is set to the second content in which the time when the first content 110 is captured is closer to the center of a time period during which the second content is captured, and time periods during which the second content has been recorded before and after the time when the first content 110 is captured are shorter. Therefore, it is determined that the second content 111 is higher in priority.

In the edit processing performed by the generation unit 1001, respective parts of the second contents are combined in descending order of priorities assigned to the second contents, to generate one edited moving image 1205. In this case, if it is determined that a newly generated content puts pressure on a resource such as a storage area in the terminal of the determination unit 1002, processing for not combining the lower-priority second contents can also be performed.

The above-described procedure enables, even if a plurality of second contents exists, the second contents to be associated with the first content by determining priorities assigned to the second contents and generating a new second content obtained by combining the second contents. If not only a part but also the whole of each of all the plurality of second contents may be transmitted, or if the whole or a part of each of the second contents may be transmitted, the generation unit 1001 may combine the second contents to generate one edited moving image.

When only a part of each of all the plurality of second contents may be transmitted, as in the present exemplary embodiment, if processing for combining the second contents to generate one edited moving image is performed, a resource (a memory, a hard disk, or the like) is not subjected to pressure in a terminal of which resource is small in capacity.

According to the first to third exemplary embodiments, a storage medium storing a program code of software for implementing the functions of each of the above-described exemplary embodiments is supplied to a system or an information processing apparatus. The storage medium is a computer readable medium. The functions can also be achieved when a computer (or a CPU or a micro processing unit (MPU)) in the system or the information processing apparatus reads out and executes the program code stored in the storage medium.

Figure 13:
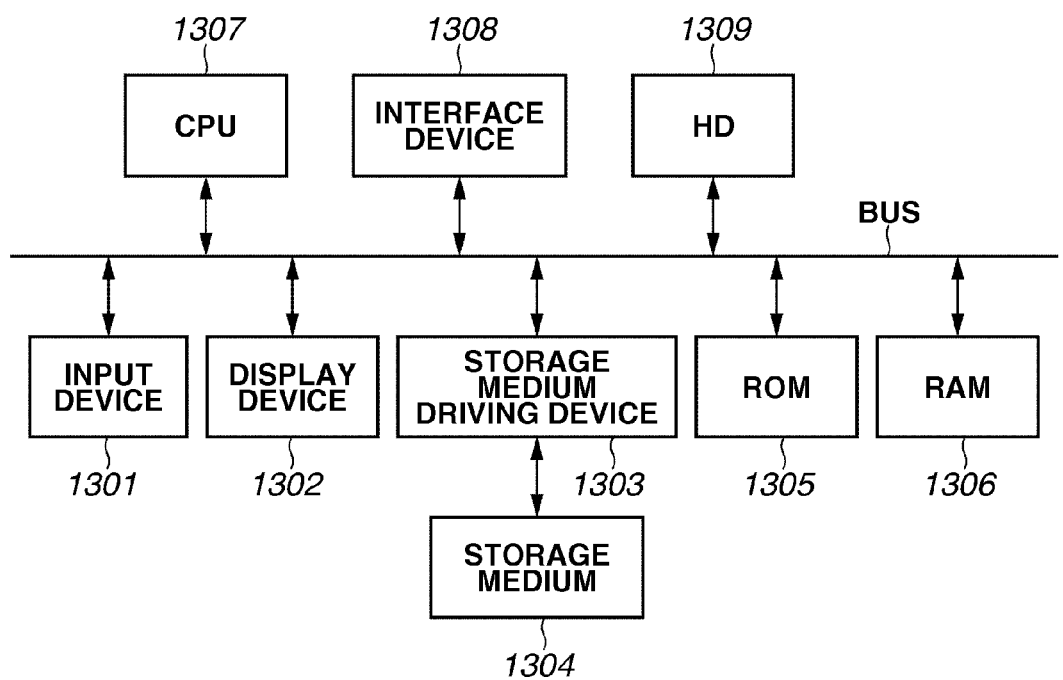
FIG. 13 illustrates an example of a hardware configuration of an information processing apparatus.

FIG. 13 illustrates an example of a hardware configuration of an information processing apparatus that executes software for implementing the functions of the above-described exemplary embodiments. As illustrated in FIG. 13, the information processing apparatus includes an input device 1301, a display device 1302, and a storage medium driving device 1303 as the hardware configuration.

Further, the information processing apparatus includes a read-only memory (ROM) 1305, a random access memory (RAM) 1306, a CPU (or an MPU) 1307, an interface device 1308, and a hard disk (HD) 1309. The input device 1301 includes a keyboard and a mouse that are operated by an operator of the information processing apparatus, and is used to input various types of operation information to the information processing apparatus. The display device 1302 includes a display and others to be used by the operator of the information processing apparatus, and is used to display various types of information (or screens). The interface device 1308 is an interface for connecting the information processing apparatus to a network.

A content association program corresponding to authority according to a flowchart illustrating the above-described processing procedure is provided to the information processing apparatus by a computer readable storage medium 1304 such as a compact disc read-only memory (CD-ROM), or is downloaded via the network. The storage medium 1304 is set in the storage medium driving device 1303 so that a control program is installed in the HD 1309 from the storage medium 1304 via the storage medium driving device 1303.

The ROM 1305 stores a control program first read when power to the information processing apparatus is turned on. The RAM 1306 is a main memory for the information processing apparatus. The CPU 1307 reads out the control program from the HD 1309, stores the read control program in the RAM 1306, and executes the control program, to implement the above-described processing content.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-018557 filed Jan. 31, 2012, which is hereby incorporated by reference herein in its entirety.

What is claimed is:

1. A transmission apparatus capable of transmitting a first content stored in a first storage area to a receiving apparatus, the transmission apparatus comprising:
   a determination unit configured to determine whether the receiving apparatus has authority to access a second storage area storing a second content associated with the first content stored in the first storage area;
   a storing control unit configured to store the second content in a third storage area which the receiving apparatus has authority to access in a case where the receiving apparatus does not have authority to access the second storage area; and a transmission unit configured to transmit, in a case where the receiving apparatus has the authority to access the second storage area, to the receiving apparatus access information for accessing the second storage area storing the second content and to transmit, in a case where the receiving apparatus does not have the authority to access the second storage area to the receiving apparatus access information for accessing the third storage area storing the second content, the receiving apparatus having the authority to access the third storage area;

a detection unit configured to detect the second content associated with the first content and a third content associated with the first content, wherein the transmission unit transmits to the receiving apparatus access information for accessing a storage area storing a content to be selected based on a time when the second content is captured and a time when the third content is captured.

2. The transmission apparatus according to claim 1, wherein, in a case where transmission of the second content to the receiving apparatus is limited, the transmission unit does not transmit access information for accessing a storage storing the second content to the receiving apparatus.

3. The transmission apparatus according to claim 1, further comprising a detection unit configured to detect the second content associated with the first content and a third content associated with the first content, wherein the determination unit performs a first determination for determining whether the receiving apparatus has authority to access the second storage area storing the second content and a second determination for determining whether the receiving apparatus has authority to access a fourth storage area storing the third content in an order based on a time when the second content is captured and a time when the third content is captured.

4. The transmission apparatus according to claim 1, further comprising a combination unit configured to combine the second content associated with the first content with a third content associated with the first content, wherein the transmission unit transmits access information for accessing the contents combined by the combination unit to the receiving apparatus in a case where the receiving apparatus does not have authority to access the second storage area.

5. The transmission apparatus according to claim 1, wherein the transmission unit associates the access information with the first content and transmits the access information associated with the first content to the receiving apparatus.

6. The transmission apparatus according to claim 1, wherein the first content is a still image and the second content is a moving image.

7. A method for transmitting a first content stored in a first storage area to a receiving apparatus, the method comprising:
determining whether the receiving apparatus has authority to access a second content storage area storing a second content associated with the first content stored in the first storage area;
storing the second content in a third storage area which the receiving apparatus as authority to access in a case where the receiving apparatus does not have authority to access the second storage area; and
transmitting, in a case where the receiving apparatus has the authority to access the second storage area, to the receiving apparatus access information for accessing the second storage area storing the second content and transmitting, in a case where the receiving apparatus does not have the authority to access the second storage area, access information for accessing the third storage area storing the second content to the receiving apparatus, the receiving apparatus having the authority to access the third storage area;
detecting the second content associated with the first content and a third content associated with the first content, and
transmitting to the receiving apparatus access information for accessing a storage area storing a content to be selected based on a time when the second content is captured and a time when the third content is captured.

8. The method according to claim 7, wherein access information for accessing a storage area storing the second content is not transmitted to the receiving apparatus in a case where transmission of the second content to the receiving apparatus is limited.

9. A non-transitory recording medium recording a program to be executed by a transmission apparatus capable of transmitting a first content stored in a first storage area to a receiving apparatus, the program comprising:
determining whether the receiving apparatus has authority to access a second storage area storing a second content associated with the first content stored in the first storage area;
storing the second content in a third storage area which the receiving apparatus has authority to access in a case where the receiving apparatus does not have authority to access the second storage area; and
transmitting, in a case where the receiving apparatus has the authority to access the second storage are, to the receiving apparatus access information for accessing the second storage area storing the second content and transmitting, in a case where the receiving apparatus does not have the authority to access the second storage area, to the receiving apparatus access information for accessing the third storage area storing the second content, the receiving apparatus having the authority to access the third storage area;
detecting the second content associated with the first content and a third content associated with the first content, wherein access information for accessing a storage area storing a content to be selected based on a time when the second content is captured and a time when the third content is captured is transmitted to the receiving apparatus.

10. The recording medium according to claim 9, wherein the access information for accessing a storage area storing the second content is not transmitted to the receiving apparatus in a case where transmission of the second content to the receiving apparatus is limited.

11. A transmission system capable of transmitting a first content stored in a first storage area to a receiving apparatus, the transmission system comprising:
a determination unit configured to determine whether the receiving apparatus has authority to access a second storage area storing a second content associated with the first content stored in the first storage area;
a storing control unit configured to store the second content in a third storage area different from the second storage area which the receiving apparatus has authority to access in a case where the receiving apparatus does not have authority to access the second storage area; and
a transmission unit configured to transmit, in a case wherein the receiving apparatus has the authority to access the second storage area, to the receiving apparatus access information for accessing the second storage area storing the second content and to transmit, in a case where the receiving apparatus does not have the authority to access the second storage area, to the receiving apparatus access information for accessing the third storage area storing the second content, the receiving apparatus has authority to access the third storage area;
a detection unit configured to detect the second content associated with the first content and a third content associated with the first content, wherein the transmission unit transmits to the receiving apparatus access information for accessing a storage area storing a content to be selected based on a time when the second content is captured and a time when the third content is captured.

12. The system according to claim 11, further comprising:
a combination unit configured to combine the second content associated with the first content with a third content associated with the first content,
wherein the transmission unit transmits access information for accessing the contents combined by the combination unit to the receiving apparatus in a case where the receiving apparatus does not have authority to access the second storage area.

* * * * *